United States Patent Office 3,010,951
Patented Nov. 28, 1961

3,010,951
POLYMERIC COMPOSITIONS
John A. Price, Swarthmore, Pa., assignor to American Viscose Corporation, Philadelphia, Pa., a corporation of Delaware
No Drawing. Filed Jan. 8, 1960, Ser. No. 1,190
1 Claim. (Cl. 260—93.7)

This invention relates to new compositions of matter, and is particularly directed to a polymer of 3,5,5-trimethyl-1-hexene.

I have discovered that 3,5,5-trimethyl-1-hexene may be polymerized in the presence of a coordination complex catalyst and in the presence of an inert saturated hydrocarbon solvent such as hexane, heptane, or isooctane to a solid polymer characterized by a crystalline melting point of approximately 422° C., and by insolubility in hydrocarbon solvents. The polymer of the present invention may be fabricated into molded articles, films and fibers, and articles made therefrom will withstand service temperatures far higher than similar articles fabricated from any thermoplastic material commercially available at the present time.

The term "coordination catalyst" when used in the specification and claim means a catalyst composed of the reaction product of a halide of a metal of groups IVa, Va and VIa of the periodic system and a reducing agent such as a metal hydride or an organometallic compound of a metal of groups Ia, IIb and IIIb of the periodic table. Particularly useful catalyst systems comprise a titanium halide and an organo-aluminum compound, such as $TiCl_4$—$Al(C_4H_9)_3$; $TiCl_3$—$Al(C_2H_5)_3$
$TiCl_4$—$Al(C_2H_5)_2Cl$; $TiCl_3$—$AlC_2H_5Cl_2$—$Al(C_2H_5)_3$ and the like. Preferably, the Al/Ti mol ratio is from 1:1 to 6:1. By "crystalline melting point" I mean the temperature at which birefringence disappears when the polymer is viewed through a polarizing microscope. Melting points so determined are not strictly reproducible, and may vary from 10° C. to 15° C. on the same sample.

The monomer used as a starting material in the preparation of my new polymer may be prepared by esterification of 3,5,5-trimethyl-1-hexanol, and pyrolysis of the ester to yield the olefin. Other methods of preparation may also be used. For example, 3,5,5-trimethylhexene-1 may be prepared by the following procedure.

The 3,5,5-trimethyl-1-hexanol, obtained from a commercial source, was mixed with five mols of acetic anhydride and one mol of acetic acid per mol of alcohol, and the resulting solution was refluxed for 8 hours. The solution was then cooled to 25° C., poured into an equal volume of water, and allowed to stand overnight. The aqueous layer was then separated, and the ester layer was washed with water and sodium bicarbonate solution, and dried. Upon distillation, 3,5,5-trimethyl-1-hexanol acetate having a boiling range of 114–118° C. at 50 mm. and a refractive index of $n_D^{20}$ 1.4202, was recovered.

The acetate was then pyrolyzed by dripping it in an atmosphere of nitrogen at a rate of 30–40 ml. per hour through a 30 mm. Vycor tube, 80 cm. long and packed with ⅛" glass helices heated to 450–500° C. From the pyrolyzate 3,5,5-trimethyl-1-hexene, having a boiling range of 118–120° C., was recovered by distillation.

This monomer may be readily polymerized to a high melting polymer insoluble in hydrocarbon solvents as shown in the following example.

*Example I*

A reaction vessel was purged with nitrogen and charged with 100 ml. of heptane, 6.8 ml. of aluminum triisobutyl, and 2.8 ml. of titanium tetrachloride. Fifty grams of 3,5,5-trimethyl-1-hexene were added to the catalyst slurry and the resultant slurry was stirred and refluxed for 22 hours. The slurry was cooled to room temperature, treated with 100 ml. of isopropanol to deactivate the catalyst, and heated again to reflux temperature for 15 minutes in order to dissolve catalyst residues.

The polymer formed was collected on a sintered glass funnel and washed with 100 ml. of isopropanol. It was then washed with three 100 ml. portions of a solution containing 200 ml. of methanol and 100 ml. of 18% hydrochloric acid. It was finally washed with three 100 ml. portions of methanol and dried overnight in a vacuum oven at 55° C. 5.4 grams of a dry, white, powdery polymer were recovered. The polymer was insoluble in decahydronaphthalene at 135° C., and had a crystalline melting point of 422° C.

The invention claimed is:

Poly(3,5,5-trimethyl-1-hexene), characterized by having a crystalline melting point of approximately 422° C., and by being insoluble in hydrocarbon solvents at temperatures below 135° C.

References Cited in the file of this patent
UNITED STATES PATENTS 2,908,669  Hagemeyer et al. _____ Oct. 13, 1959

FOREIGN PATENTS 808,144  Great Britain _____ Jan. 28, 1959